(12) United States Patent
Ouchi et al.

(10) Patent No.: US 7,099,894 B2
(45) Date of Patent: Aug. 29, 2006

(54) MULTIMEDIA INFORMATION COLLECTION CONTROL APPARATUS AND METHOD

(75) Inventors: Kazushige Ouchi, Tokyo (JP); Yoshihiro Ohmori, Kanagawa-ken (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 153 days.

(21) Appl. No.: 10/634,768

(22) Filed: Aug. 6, 2003

(65) Prior Publication Data

US 2005/0080789 A1    Apr. 14, 2005

Related U.S. Application Data

(62) Division of application No. 09/667,784, filed on Sep. 22, 2000, now Pat. No. 6,629,107.

(30) Foreign Application Priority Data

Sep. 22, 1999    (JP) ............... P11-268357

(51) Int. Cl.
G06F 17/30 (2006.01)
G06F 17/40 (2006.01)
(52) U.S. Cl. ............. 707/104.1; 707/102; 715/863
(58) Field of Classification Search ............. 707/104.1, 707/102, 103; 382/115–118, 175, 176; 715/863
See application file for complete search history.

(56) References Cited

U.S. PATENT DOCUMENTS

| 5,535,063 A | 7/1996 | Lamming |
| 5,613,032 A | 3/1997 | Cruz et al. |
| 5,717,869 A | 2/1998 | Moran et al. |
| 5,761,340 A | 6/1998 | Suzuki |
| 5,802,314 A | 9/1998 | Tullis et al. |
| 5,826,263 A | 10/1998 | Nakabayashi et al. |
| 5,832,499 A | 11/1998 | Gustman |
| 5,856,877 A | 1/1999 | Burger et al. |
| 5,862,223 A * | 1/1999 | Walker et al. ............... 705/50 |
| 5,881,134 A * | 3/1999 | Foster et al. ............ 379/88.01 |
| 5,894,306 A | 4/1999 | Ichimura |
| 5,897,616 A * | 4/1999 | Kanevsky et al. .......... 704/246 |
| 5,956,681 A | 9/1999 | Yamakita |
| 6,054,990 A | 4/2000 | Tran |
| 6,055,536 A | 4/2000 | Shimakawa et al. |
| 6,076,068 A * | 6/2000 | DeLapa et al. ............... 705/14 |

(Continued)

FOREIGN PATENT DOCUMENTS

JP    10-49515    2/1998

OTHER PUBLICATIONS

Wactlar et al., "Informedia Experience-on-Demand: Capturing, Integrating and Communicating Experiences Across People, Time and Space," ACM Computing Surveys (CSUR) (Jun. 1999), vol. 31, Issue 2es, Article No. 9.

(Continued)

Primary Examiner—Hosain Alam
Assistant Examiner—Brian Goddard
(74) Attorney, Agent, or Firm—Finnegan, Henderson, Farabow, Garrett & Dunner, L.L.P.

(57) ABSTRACT

In a multimedia information collection control apparatus, a multimedia information collection unit collects information from more than one kind of medium (multimedia). A multimedia correspondence memory correspondingly stores multimedia information collected by the multimedia information collection unit. An information recognition unit recognizes the multimedia information stored in the multimedia correspondence memory and analyzes the multimedia information as personal data according to the recognition result. A multimedia database relationally stores the multimedia information as the personal data analyzed by the information recognition unit.

17 Claims, 15 Drawing Sheets

U.S. PATENT DOCUMENTS

| | | |
|---|---|---|
| 6,092,080 A | 7/2000 | Gustman |
| 6,148,304 A | 11/2000 | de Vries et al. |
| 6,199,044 B1 | 3/2001 | Ackley et al. |
| 6,202,060 B1 | 3/2001 | Tran |
| 6,363,380 B1 | 3/2002 | Dimitrova |
| 6,396,954 B1 | 5/2002 | Kondo |
| 6,396,963 B1 | 5/2002 | Shaffer et al. |
| 6,425,525 B1 | 7/2002 | Swaminathan et al. |
| 6,629,107 B1 * | 9/2003 | Ouchi et al. ............. 707/104.1 |
| 2002/0085759 A1 * | 7/2002 | Davies et al. ............... 382/203 |

OTHER PUBLICATIONS

Hindus et al., "Capturing, Structuring, and Representing Ubiquitous Audio," ACM Transactions on Information Systems (TOIS) (Oct. 1993), 11:376-400.

* cited by examiner

FIG. 8

61 — SUZUKI: 「○×○×○×」
TANAKA: 「△▽▲▼」
SATO: 「■◆◇□」
TANAKA: 「△▽▲▼△▽▲」
SATO: 「◇□◆」
SUZUKI: 「○×○」
TANAKA: 「△▽▲▼△▽▲」
SATO: 「■◇□」
TANAKA: 「△▽▲▼」
SUZUKI: 「○×○×○×」
62

FIG. 9

00658M
NAME : ICHIRO SUZUKI
COMPANY NAME : TOSHIBA CORPORATION
ADDRESS : - - - - -MINATO-KU, TOKYO, 123-4567, JAPAN
TELEPHONE : (03)3456-????
FACSIMILE : (03)7890-????
FACE : face038.jpg
CARD : card064.jpg
MEETING(1) : PLANNING MEETING OF NEW ENTERPRISE (JULY 12, 1999)
UTTERANCE(1) : utter021.mp3,utter021.txt
MATERIAL(1) : 990712.ppt
MEETING(2) : PROPOSAL MEETING OF NEW ENTERPRISE (JUNE 24,1999)
UTTERANCE(2) : utter013.mp3,utter012.txt
MATERIAL(2) : 990624.ppt
MEMO : draft42.gif

FIG. 10

```
<PERSONAL RECORD>
<NAME • FACE ="face038.jpg"> —74
<FAMILY NAME> SUZUKI </FAMILY NAME>
<FIRST NAME> ICHIRO </FIRST NAME>
</NAME> —75
<COMPANY • CARD ="card064.jpg">
<COMPANY NAME \ TOSHIBA CORPORATION </COMPANY NAME>
<ADDRESS ZIP CODE ="123-4567"> - - - MINATO-KU, TOKYO, JAPAN
<TELEPHONE> (03)3453-???? </TELEPHONE>
<FACSIMILE> (03)7890-???? </FACSIMILE>
</COMPANY> —76
<MEETING>
<MEETING NAME> PLANNING MEETING OF NEW ENTERPRISE </MEETING NAME> —77
<UTTERANCE SVC = "utter021.wav"> utter021.txt </UTTERANCE>
<MATERIAL SVC ="990712.ppt"/>
</MEETING>
<MEETING>
<MEETING NAME> PROPOSAL MEETING OF NEW ENTERPRISE </MEETING NAME>
<UTTERANCE SVC ="utter013.wav"/> utter013.txt</UTTERRANCE>
<MATERIAL SVC ="990624.ppt"/>
</MEETING>
<MEMO SVC ="draft42.gif"/>
</PERSONAL RECORD>
```

FIG. 13
◁ | RETRIEVAL
81 — WHO ATTENDED THE PLANNING MEETING WHICH MR. SUZUKI ATTENDED?
82 — MEETING NAME: PLANNING MEETING OF NEW ENTERPRISE
DATE: JULY 12, 1999 AM 10:00 ~ AM 11:30
PLACE: TOSHIBA CORPORATION, FIRST MEETING ROOM
ICHIRO SUZUKI
TOSHIBA CORPORATION, TRADE DIVISION, MANAGER
MEMO: - - - - - - -
JIRO TANAKA
TOSHIBA CORPORATION, ACCOUNTING DIVISION, MANAGER
MEMO: - - - - - - -
83 — 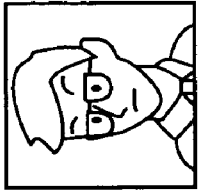 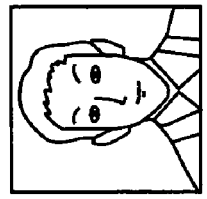
1    2 ere is also provided a method for controlling collection of multimedia information, comprising the steps of: collecting information from more than one kind of medium; corres...

MULTIMEDIA INFORMATION COLLECTION CONTROL APPARATUS AND METHOD

This is a division of application Ser. No. 09/667,784, filed Sep. 22, 2000 now U.S. Pat. No. 6,629,107, which is incorporated herein by reference.

FIELD OF THE INVENTION

The present invention relates to a multimedia information collection control apparatus and a method to collect information of each kind of multimedia and to relationally store the multimedia information as accessible personal data.

BACKGROUND OF THE INVENTION

As an equipment to record a still image, for example, a digital still camera is widely used. Some digital still cameras include a function to attach an annotation such as a record date and a user's speech to the still image. Furthermore, as an equipment to record a dynamic image, for example, a digital movie is widely used. Some digital movies includes not only a function to record the dynamic image with a sound but also a function to attach the annotation such as the record date and a title. In above-mentioned equipment to collect multimedia information of the prior art, each kind of the multimedia information is collected. However, the process to store the multimedia information in a database, i.e., an arrangement, an editing, an extraction, a relation of the multimedia information, requires the user's help. Accordingly, the effort to create the multimedia database consumes the labor of the user.

As mentioned-above, in a multimedia information collection equipment of the prior art, each kind of the multimedia information is collected. However, in order to compose the multimedia database, the user must take the trouble to do various kinds of operation, such as the arrangement, the editing, the extraction, and the relation of the multimedia information. In short, the user's burden greatly increases to compose the multimedia database.

Accordingly, it is desired that collected multimedia information is arranged and related without the user's effort. Furthermore, a development of the technique to compose the multimedia database able to variously retrieve data is generally desired.

SUMMARY OF THE INVENTION

It is an object of the present invention to provide a multimedia information collection control apparatus and a method to automatically arrange, edit, extract, and relate various kinds of the multimedia information and to easily compose the multimedia database.

According to the present invention, there is provided a multimedia information collection control apparatus, comprising: multimedia information collection unit configured to collect information from more than one kind of medium (multimedia information); multimedia correspondence memory configured to correspondingly store multimedia information collected by said multimedia information collection unit; information recognition unit configured to recognize the multimedia information stored in said multimedia correspondence memory, and to analyze the multimedia information as personal data according to the recognition result; and multimedia database configured to relationally store the multimedia information as the personal data analyzeded by said information recognition unit.

Further in accordance with the present invention, there is also provided a method for controlling collection of multimedia information, comprising the steps of: collecting information from more than one kind of medium; correspondingly storing multimedia information collected at the collecting step; recognizing the multimedia information stored at the storing step; analyzing the multimedia information as personal data according to the recognition result; and relationally storing the multimedia information as the personal data analyzed at the analyzing step.

Further in accordance with the present invention, there is also provided a computer readable memory containing computer readable instructions to control collection of multimedia information, comprising: an instruction means for causing a computer to collect information from more than one kind of medium; an instruction means for causing a computer to correspondingly store multimedia information collected; an instruction means for causing a computer to recognize the multimedia information stored; an instruction means for causing a computer to analyze the multimedia information as personal data according to the recognition result; and an instruction means for causing a computer to relationally store the multimedia information as the personal data analyzed.

BRIEF DESCRIPTION OF THE DRAWINGS

FIG. 8 is a schematic diagram of one example of utterances of three persons present at a meeting.

FIG. 9 is a schematic diagram of one example of content stored in the multimedia database according to the present invention.

FIG. 10 is a schematic diagram of another example of content stored in the multimedia database according to the present invention.

FIG. 13 is a schematic diagram of one example of the retrieval result displayed by a multimedia information presentation unit according to the second embodiment.

DETAILED DESCRIPTION OF THE PREFERRED EMBODIMENTS

Figure 1:
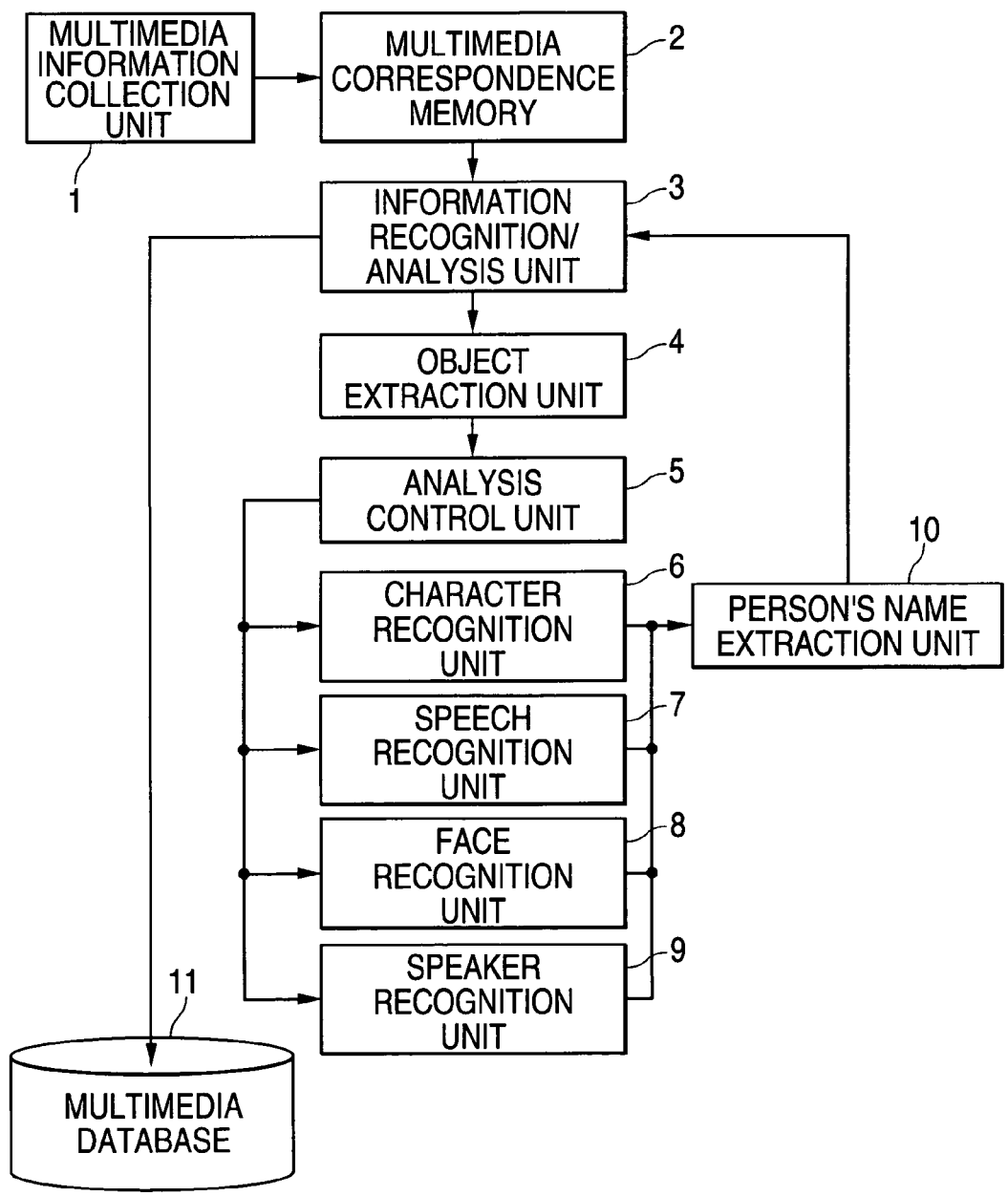
FIG. 1 is a block diagram of the multimedia information collection control apparatus according to a first embodiment of the present invention.

Embodiments of the present invention will be explained by referring to the Figures. In the first embodiment, the multimedia information such as speech data, character data, and image data are collected. In the multimedia information, related data are arranged and relationally stored as a database. FIG. 1 is a block diagram of the multimedia information collection control apparatus according to the first embodiment. As shown in FIG. 1, the multimedia information collection control apparatus consists of a multimedia information collection unit 1, a multimedia correspondence memory 2, an information recognition/analysis unit 3, an object extraction unit 4, an analysis control unit 5, a character recognition unit 6, a speech recognition unit 7, a face recognition unit 8, a speaker recognition unit 9, a person's name extraction unit 10, and a multimedia database 11.

The multimedia information collection unit 1 collects the multimedia information such as an image, speech, a character, or a figure. For example, the multimedia information collection unit 1 includes a digital camera or a digital movie for obtaining the image data, a microphone for obtaining the speech data, and a character/figure recognition function by operation of a pen input device for obtaining character/figure. Furthermore, the multimedia information collection unit 1 extracts related information from the collected multimedia information and correspondingly stores the related information in the multimedia correspondence memory 2. The multimedia correspondence memory 2 correspondingly stores the related information of each included medium (image, speech, character (text), or figure) in the multimedia information collected by the multimedia information collection unit 1.

The information recognition/analysis unit 3 extracts the related information from the multimedia correspondence memory 2 and recognizes/analyzes the related information. Concretely, the information recognition/analysis unit 3 extracts data of each medium stored in the multimedia correspondence memory 2, recognizes/analyzes the extracted data, and specifies a person related to the extracted data. Furthermore, the information recognition/analysis unit 3 relationally stores the analysis result and the related multimedia information in the multimedia database 11.

When the multimedia information collection unit 1 collects information of each medium, and a mark representing a recognition area is recorded in the information by a user's operation, the object extraction unit 4 recognizes an image in the recognition area based on attribute of the mark and extracts the analysis object. The analysis control unit 5 controls a knowledge dictionary and a method used for recognition/analysis according to the attribute of the mark extracted by the object extraction unit 4.

The character recognition unit 6 recognizes characters in the image. The speech recognition unit 7 recognizes the collected speech corresponding to the image and other medium. In this case, the speech data is converted to character data by speech recognition processing. The face recognition unit 8 recognizes a face part in the image, i.e., feature points in the face part in order to discriminate an individual by facial characteristics of each person. The speaker recognition unit 9 recognizes (identifies) a speaker by the collected speech corresponding to the image and other medium. The person's name extraction unit 10 extracts a person's name from the recognition result of the character recognition unit 6. The multimedia database 11 relationally stores the analysis data and corresponding multimedia information stored in the multimedia correspondence memory 2. The information recognition/analysis unit 3 controls storing information in the multimedia database 11.

Figure 2:
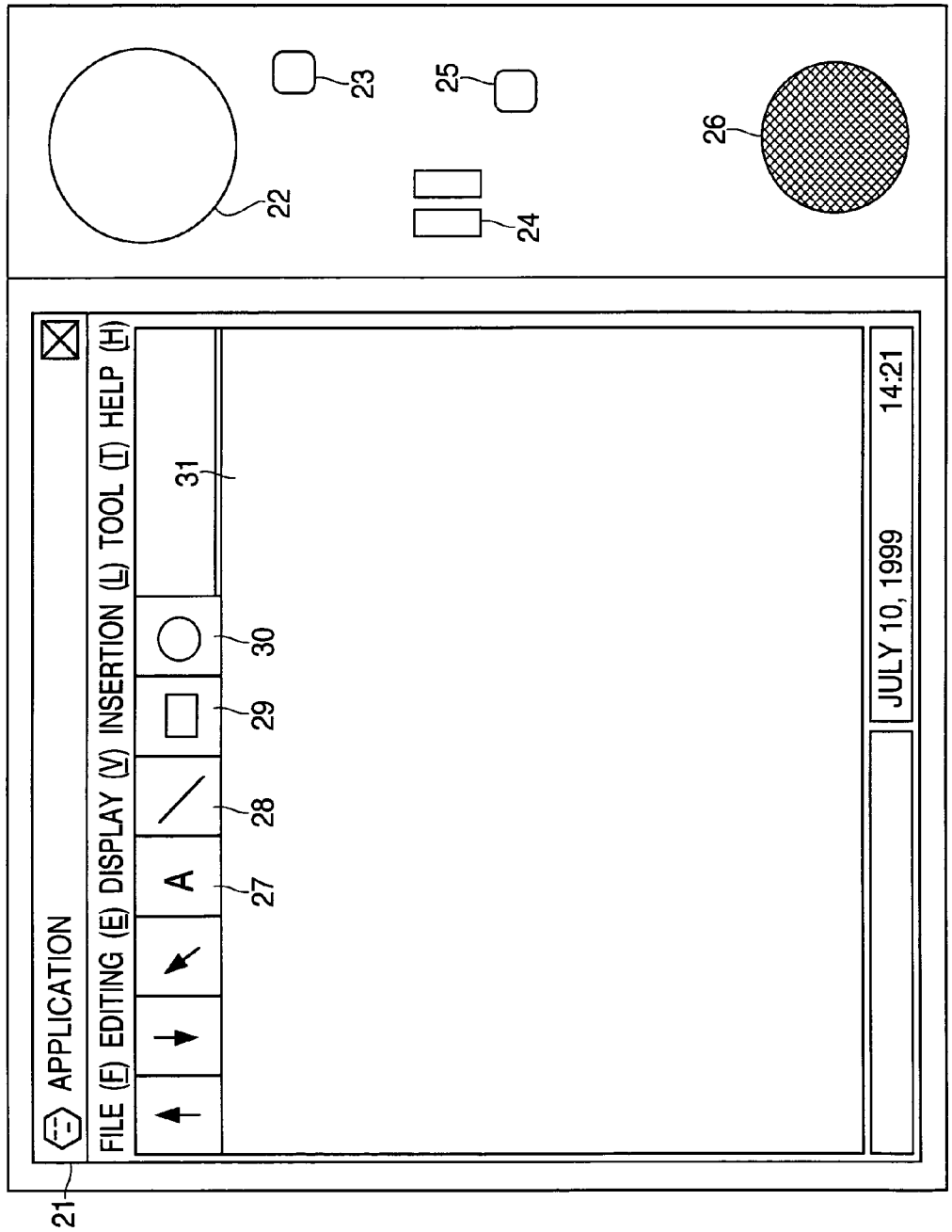
FIG. 2 is a schematic diagram of a front operation part of a multimedia information collection unit in FIG. 1.

FIG. 2 is a schematic diagram of a front operation part as one component of the multimedia information collection unit 1. As shown in FIG. 2, a display, a camera, a speaker, a microphone, and an operation button are laid out on the front operation part. For example, the display is a liquid panel display. A video image previously taken, or currently sent from the digital camera, is presented through the display. Furthermore, an application screen for the user's operation to collect information is presented through the display and used as an information operation section 21 for the user to operate on the display. Concretely, a forward button, a point button, and a character input button, a figure input button, a recognition area indication button are located as an edge part on the screen. When the user indicates a position and clicks by a pointing device such as a mouse, a function of processing represented by the button is executed on the screen. In FIG. 2, the character input button 27, the figure input button 28, the recognition area indication button (square area) 29, the recognition area indication button (circle area) 30, and an information screen 31 are prepared. The information screen 31 is used as the area to display the image and characters.

While the image is displayed through the information screen 31, the user indicates a position on the image and selects the recognition area indication button (square area) 29 using a pointing device. Then, the user drags a square appeared on the screen and desirably adjusts an area of the square using the pointing device. After determining the area of the square, this area is recognized as a character recognition area by the application. Furthermore, while the image is displayed through the information screen 31, the user indicates a position on the image and selects the recognition area indication button (circle area) 30 using the pointing device. Then, the user drags a circle appeared on the screen and desirably adjusts an area of the circle using the pointing device. After determining the area of the circle, this area is recognized as an image recognition area by the application.

Furthermore, on a horizontal edge part of the information operation section 21, a plurality of menu buttons to indicate each function such as a file function, an editing function, a display function, an insertion function, a tool function, or a help function are displayed. The user selectively indicates these menu buttons in order to utilize the function. In FIG. 2, a lens part 22 of the digital camera is included on the front operation part. The direction of the lens part 22 is freely variable by the user, and it is possible to take an image of an object from arbitrary view direction while displaying the image on the information screen 31. The image is taken by the digital camera through the lens part 22 and obtained as the image data. A shutter button 23 of the digital camera is included on the front operation part. By pushing the shutter button 23, the shutter of the digital camera is released and the image is taken. A microphone 24 is included on the front operation part, and a recording button 25 causes the microphone 24 to record the speech data is equipped. A speaker 26 used for outputting the speech is also included on the front operation part. The digital camera and the microphone 24 comprise a device of the multimedia information collection unit 1.

For example, in case of holding a meeting, the digital camera takes an image of meeting material in which a meeting name, a subject for discussion, a place, a date, and attendant's name, and this image is stored as data of relational material. Then, the digital camera takes an image of the face of each attendant. After collecting each face image, the user marks the face area on each image, and characteristics of the face of each attendant is collected. In case of giving the attendant's card, the digital camera takes an image of the card, and personal data such as name and company name in the image are converted to text data by character recognition. Furthermore, the speech data such as self-introduction are processed by the speech recognition unit. In this way, basic data to specify the individual are collected. For the collected data, in order to retrieve suitable data by unit of person or company, a database in which related data are linked is automatically created. Furthermore, by obtaining the minutes or utterance content, the database storing these multimedia information is automatically created.

In case of collecting the characteristics of the face image, while the face image is displayed on the screen, the user marks a frame of the face area as the recognition object area. In case of collecting the character data, while the image is displayed on the screen, the user marks a frame of character area as the recognition object area. In this case, a shape of the frame is differently used by the face area and the character area. For example, in case of a circle as the frame of the recognition area, this area is recognized as the face image. In case of a square as the frame of the recognition area, this area is recognized as the character image. In short, a recognition object is uniquely determined by a shape of the frame (shape attribute of the mark). In short, the recognition object is determined by the shape of the mark, and the processing load for recognition is greatly reduced.

In this way, by inputting the image of the object through the camera and by marking the recognition area using a frame line of predetermined shape, the related data as the multimedia information are collected. Furthermore, the collected data including the characteristics of face and speech are used as a person identification. By using the result, the collected data related to the person are relationally stored in the multimedia database. Furthermore, the speech data is converted to the character data by the speech recognition, and stored in the multimedia database. If the speech data is identified as a person's voice, the character data is linked as the personal data in the multimedia database. Accordingly, the related data in the multimedia information are automatically stored as the database by simple operation and minimum load.

Figure 3:
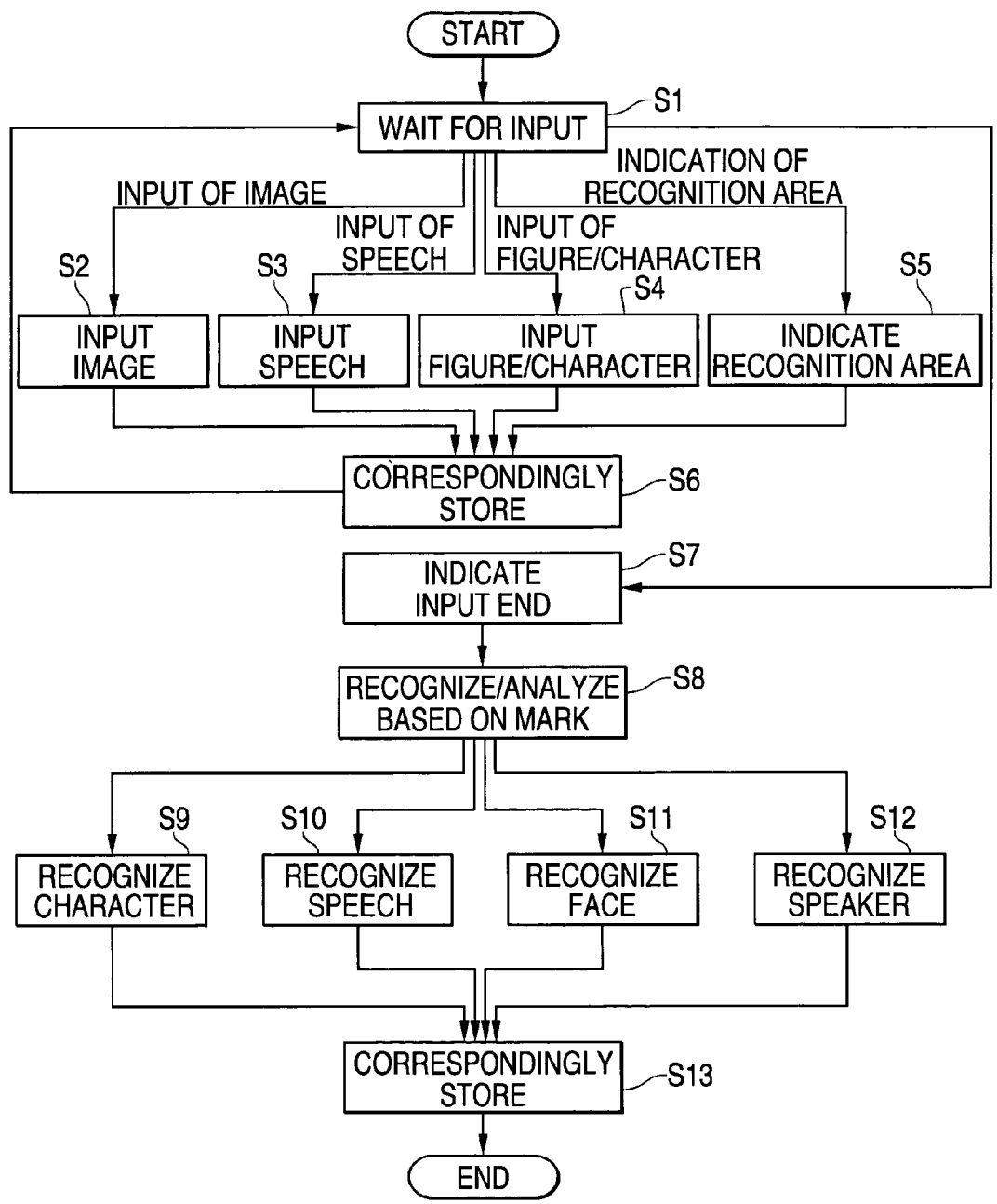
FIG. 3 is a flow chart of processing of the multimedia information collection control apparatus according to the first embodiment of the present invention.

Next, detail processing is explained. In case of creating the database by recording the meeting, the front operation part of the multimedia information collection unit 1 in FIG. 2 is set at each attendance seat of the meeting, for example, on a table in front of each attendant. Of cource, the front operation part may be commonly used for a plurality of attendants. However, in order to simply process, assume that the front operation part is respectively set for each attendant. FIG. 3 is a flow chart of processing of the multimedia information collection control apparatus according to the first embodiment. First, in response to activation of the present apparatus, the multimedia information collection unit 1 waits for input (step S1). In this case, the information screen 31 on the front operation part continuously displays a video input through the digital camera. If the multimedia information collection unit 1 is personally located, the video input from the digital camera is an image of the person taking a seat where the multimedia information collection unit 1 is located.

<Input of Image>

In this status, assume that the user (a person seated where the multimedia information collection unit 1 is located) pushes the shutter button 23 on the front operation part. Just then, an indication of input of an image is sent to the digital camera, and the image of the user is taken by the digital camera (step S2). Then, the information screen 31 on the front operation part displays the input image. Furthermore, this input image is temporarily stored in the multimedia correspondence memory 2 (step S6), and the multimedia information collection unit 1 waits for input again (step S1). In this status after inputting the image, the multimedia information collection unit 1 can receive the input of speech (S3), the input of figure/character (S4), the indication of recognition area (S5), and the input of new image (S2).

<Input of Speech>

First, the case of input of speech is explained. In the status of waiting for input, assume that the user pushes the recording button 25 on the front operation part in FIG. 2. Just then, an indication of recording of speech is sent to the microphone 24 as one component element of the multimedia information collection unit 1. In response to the indication, the multimedia information collection unit 1 inputs the speech signal from the microphone while the user pushes the recording button 25. This speech signal is converted to speech data, and temporarily stored in the multimedia correspondence memory 2 (S3). When the recording of speech is completed, the multimedia correspondence memory 2 formally stores this speech data with the multimedia information already stored (S6). Then, the multimedia information collection unit 1 waits for an input signal again (S1). In this example, the multimedia information already stored in the multimedia correspondence memory 2 is the image input by the digital camera. Accordingly, this image data and the speech data are correspondingly stored.

<Input of Figure/Character>

Next, the case of input of figure/character is explained. In the status of waiting for an input signal, assume that the user pushes the character input button 27 or the figure input button 28 on the information operation part 21 in FIG. 2. In this case, the multimedia information collection unit 1 is set as input status of figure/character (S4). The user can input figure/character on arbitrary place of the image by operating some figure/character input means (For example, a pen input apparatus, a mouse input apparatus, a tablet, or a track ball) as one component element of the multimedia information collection unit 1. Assume that the pen input apparatus is prepared as the figure/character input means. When the user pushes the figure input button 28 on the information operation part 21, the multimedia information collection unit 1 is set as a figure input mode. The user operates a pen on the screen by his hand, and the figure is input at his desired position of the image displayed on the screen. Furthermore, when the user pushes the character input button 27 on the information operation part 21, the multimedia information collection unit 1 is set as a character input mode. The user inputs handwritten characters by operating the pen on the screen. The characters are recognized by the pattern recognition processing technique, and character data are obtained. When the input of figure/character is completed, the figure/character data input by the user's operation are correspondingly stored with the multimedia information related to the user in the multimedia correspondence memory 2 (S6). Then, the multimedia information collection unit 1 waits for an input signal again (S1).

<Indication of Recognition Areas>

In the present apparatus, if the user indicates the recognition area on the image, the image in the recognition area is recognized as a character or a figure based on the indicated shape of the recognition area. In the status of waiting for an input signal, assume that the user selectively operates the recognition area indication button (square area) 29 or the recognition area indication button (circle area) 30 on the information operation part 21 in FIG. 2. In response to the operation, the multimedia information collection unit 1 is set as the status of indication of recognition area (S5). Concretely, while the image is displayed on the information screen 31, the user pushes the recognition area indication button (square area) 29 using a pointing device (the pen input apparatus, the mouse, or the track ball) and indicates a position on the image. In this case, an area frame mark of square shape appears at the position. If adjustment of position/size is necessary, the user drags the area frame mark using the pointing device and adjusts position/size of the area frame mark. Otherwise, the user indicates two points of the desired area on the image using the pen, and a square with the two points at diagonal positions appears. In this way, the user's desired area is determined as the character recognition area. Then, this square area is recognized by the application as the character recognition area.

Furthermore, when the user pushes the recognition ar a indication button (circle area) 30 using the pointing device and indicates a position on the image, the area frame mark of circular shape appears at the position. If adjustment of position/size of the area frame mark of circular shape is necessary, the user drags the area frame mark using the pointing device and adjusts the position/size of the area frame mark. Otherwise, the user indicates a center point and a radius point of the desired circle on the image using the pointing device, and a circle defined by the center point and the radius point appears. In this way, the user's desired area is determined as the image recognition area. Then, this circle area is recognized by the application as the image recognition area.

As mentioned-above, the area frame mark is selectively indicated by the image recognition shape or the character recognition shape. The information of the area frame mark is correspondingly stored with related multimedia information in the multimedia correspondence memory 2.

In response to an indication of input completion, the application for recognition processing executes a program, i.e., extracts needed data from the area image in the area frame mark by the recognition processing corresponding to a shape of the area frame mark. The application to recognize the area image is a function of the analysis control unit 5. The analysis control unit 5 selectively uses a recognition/ analysis method by a selection whether the user pushes the square area recognition indication button 29 or the circle area recognition indication button 30. Accordingly, each button is selectively used according to the recognition object. The recognition/analysis method is explained in detail below.

When the indication of the recognition area is completed, information of the indicated recognition area is correspondingly stored with the multimedia information in the multimedia correspondence memory 2 (S6), and the multimedia information collection unit 1 waits for an input signal again (S1). In case that a new image is input by the digital camera, the new image is displayed on the information screen 31. The new image is correspondingly stored with related multimedia information in the multimedia correspondence memory 2 (S6), and the multimedia information collection unit 1 waits for an input signal again (S1).

By repeating the above-mentioned operations, each multimedia information is correspondingly input. When the input of the multimedia information is completed, the user indicates an input end (S7). In response to the indication of the input end, the information recognition/analysis unit 3 extracts information stored in the multimedia correspondence memory 2 and recognizes/analyzes the information. In this case, the object extraction unit 4 extracts an object of recognition/analysis according to the area frame mark indicated as the recognition result. The analysis control unit 5 controls a knowledge dictionary and a method used for recognition/analysis according to an attribute of the area frame mark (S8).

Figure 4:
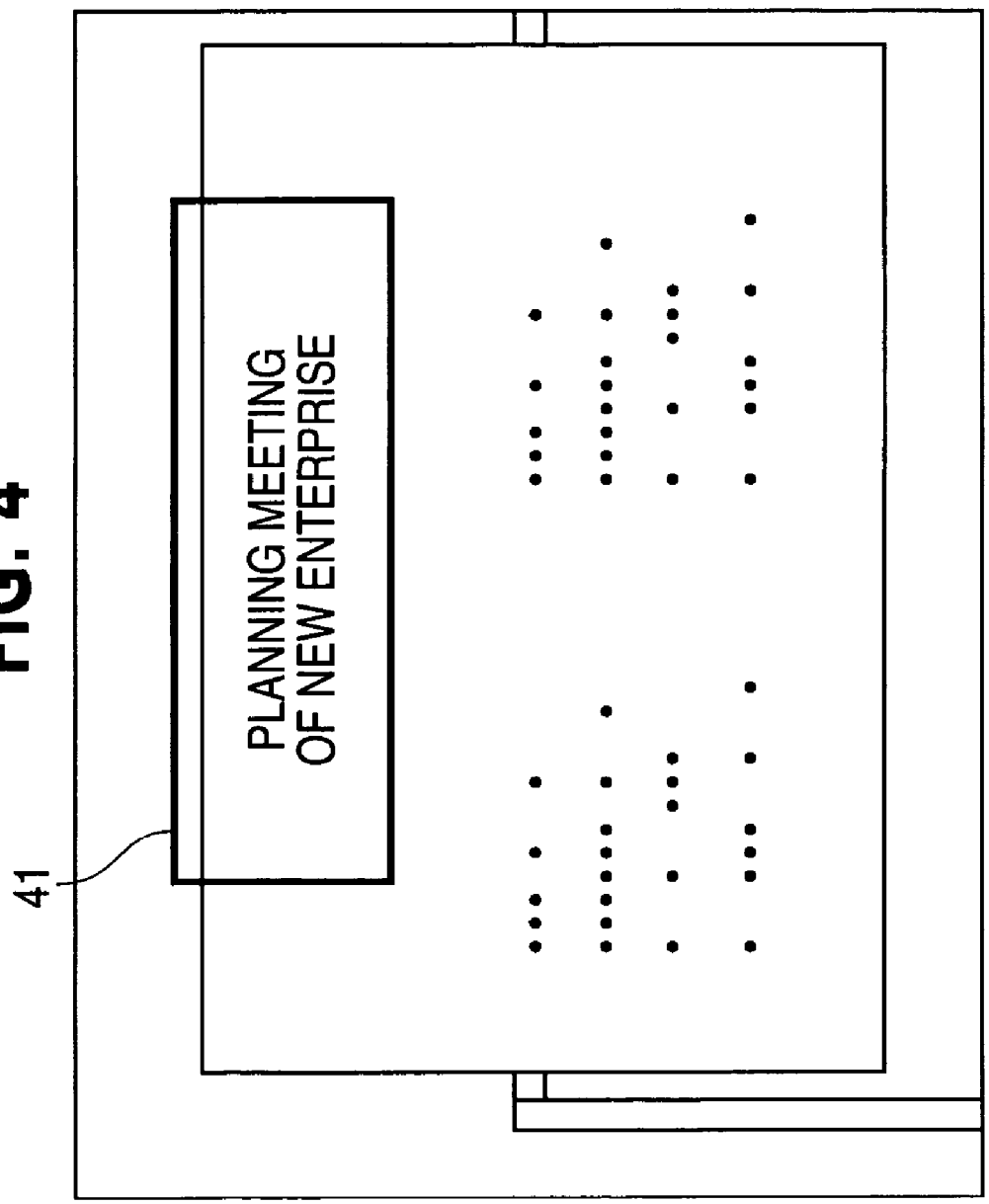
FIG. 4 is a schematic diagram of a displayed image on the front operation part on which a square mark as a recognition area is indicated.
Figure 5:
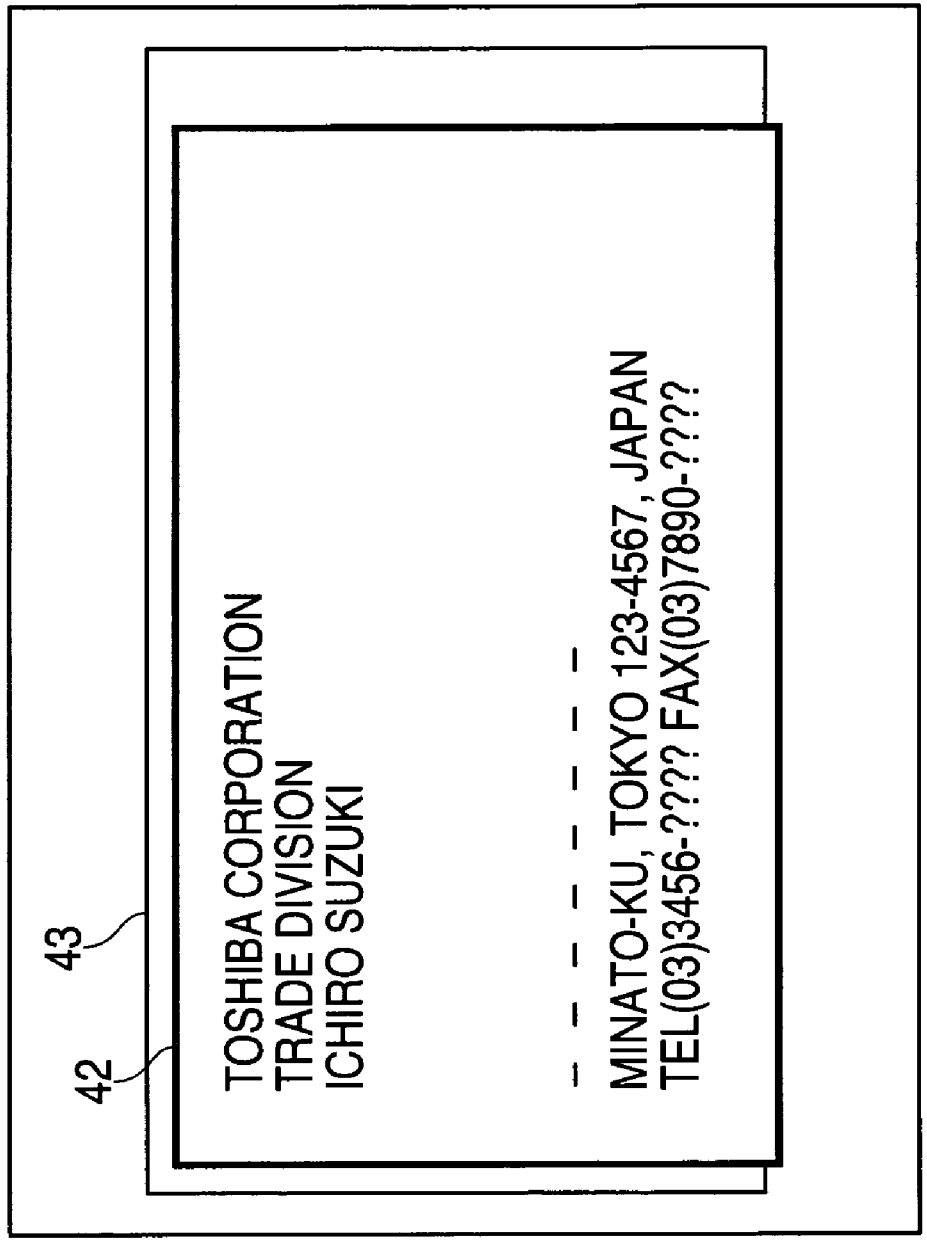
FIG. 5 is a schematic diagram of another displayed image on the front operation part on which the square mark as the recognition area is indicated.
Figure 6:
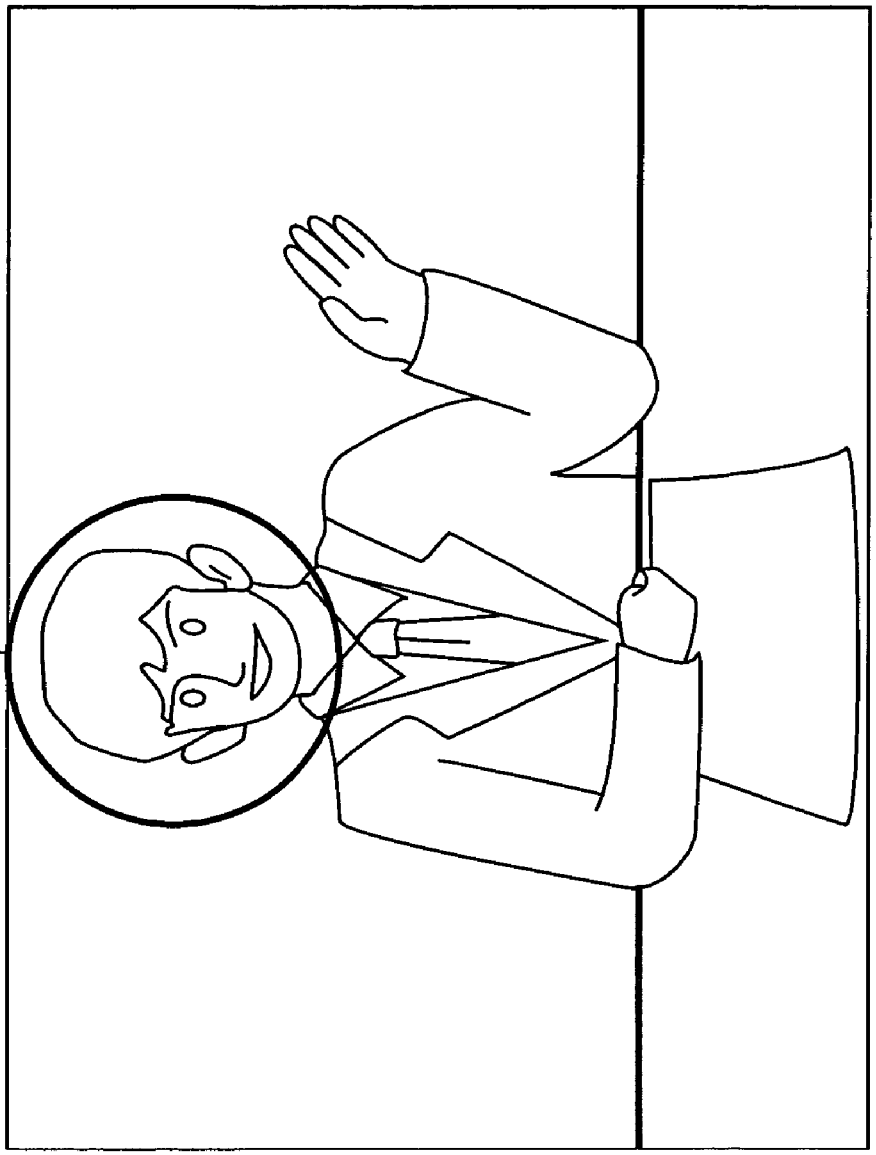
FIG. 6 is a schematic diagram of another displayed image on the front operation part on which a circle mark as the recognition area is indicated.
Figure 7:
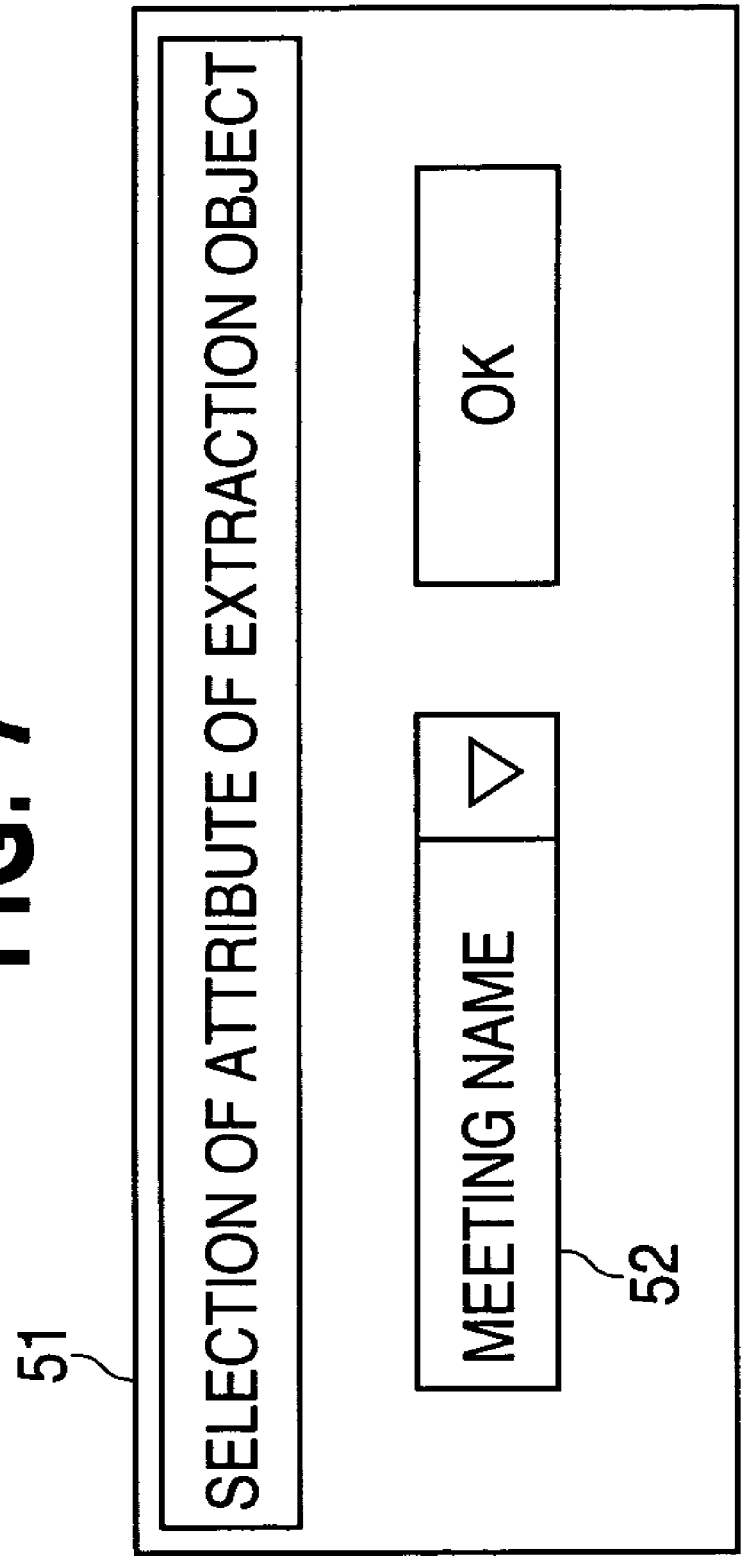
FIG. 7 is a schematic diagram of one example of attribute selection section on the front operation part.

FIGS. 4, 5, and 6 show examples of the area frame mark of the recognition area on the input image displayed on the information screen 31. In FIGS. 4 and 5, the area frame mark of square shape is indicated on the image. In FIG. 6, the area frame mark of circular shape is indicated on the image. For example, if the square mark represents the character recognition in the area, the user surrounds a circumference of characters of meeting name by a square 41. The character recognition unit 6 extracts characters in the square area and recognizes the characters (S9). In this case, the user can indicate a function to select an attribute of extraction object by opening a menu of application. As shown in FIG. 7, an attribute selection window 51 is displayed on the information screen 31, and the user selects the attribute of extraction object through the attribute selection window 51. In this attribute selection window 51, each kind of items 52 such as "date", "meeting name", "place", "card", "name", "company name", "telephone number", "section name", "address", "utterance content" are previously set as the attribute data. By displaying each kind of items, the user selects one item suitable for the recognition characters. Accordingly, the attribute suitable for the characters is assigned, and the analysis control unit 5 suitably selects a knowledge dictionary used for recognition/analysis. By using the selected knowledge dictionary, the analysis control unit 5 recognizes the image part in the area frame mark as the character. As a result, the character image in the area frame mark is correctly converted to character data. Then, this character data is relationally stored with the original image of the recognition object in the multimedia database 11 (S13). As shown in FIG. 7, in case of attribute item "meeting name", the character data is stored in correspondence with an index "meeting name" in the multimedia database 11.

In FIG. 5, the recognition area is indicated by the square 42 as the character recognition area. In this example, the recognition object is personal information such as a card. As shown in FIG. 7, the attribute selection window 51 is displayed on the information screen 31, and the user selects the attribute item 52 through this attribute selection window. In this case, the attribute item "card" is selected. The knowledge dictionary corresponding to the attribute "card" is also prepared. Accordingly, if the attribute item "card" is selected (if the displayed image includes the card only, the user need not indicate the recognition area of the card), the character recognition unit 6 extracts a plurality of character parts (a company name, a section name, a name, an address, a telephone number and so on) from the card image by referring to the selected knowledge dictionary and recognizes the character parts (S9). Especially, as for the name part, the person's name extraction unit 10 extracts this part as the person's name. The text data extracted except for the person's name are recognized/analyzed as specified personal data, and relationally stored in correspondence with the original image of the card in the multimedia database 11 (S13).

Furthermore, if the indicated recognition area is surrounded by the area frame mark of circular shape, the image in the area is recognized as a person's face. As shown in FIG. 6, the user surrounds a face part of recognition object person in the image by a circular frame 44. In this case, the face recognition unit 8 extracts the face image from the area surrounded by the circle frame 44 and recognizes facial characteristics from the face image (S11). Then, this facial characteristic data are stored in the multimedia database 11 (S13). Especially, if the person's name is extracted by the person's name extraction unit 10 through the character recognition unit 6, and if the facial characteristic is recognized by the face recognition unit 8, the recognition results of the character recognition unit 6 and the face recognition unit 8 are stored in correspondence with related multimedia information in the multimedia database 11 (S13). In this case, the extraction result by the person's name extraction unit 10 is used as heading data of the related multimedia information in the multimedia database 11.

On the other hand, if the speech data are stored in the multimedia correspondence memory 2 by operation of speech input, the speech recognition unit 7 recognizes the speech data. In short, the speech recognition unit 7 recognizes the speech data collected in correspondence with the image and other media (S10). Then, this recognition result is correspondingly stored with related multimedia information in the multimedia database 11 (S13). Furthermore, the speaker recognition unit 9 identifies a speaker from the speech collected in correspondence with the image and other media (S12). The identification result as specified personal data is correspondingly stored with related multimedia information in the multimedia database 11 (S13). For example, assume that some meeting is held and the speaker recognition unit 9 completes the speaker identification of each attendant in the meeting. In this case, the speech recognition unit 7 recognizes content of utterance of each attendant, and the content of utterance of each attendant is stored in correspondence with the name of the attendant in the multimedia database 11. This processing is executed by the information recognition/analysis unit 3. In short, in response to the speaker identification of the speaker recognition unit 9, the information recognition/analysis unit 3 relationally stores the content of utterance of each speaker with the speaker's name in the multimedia database 11. For example, as shown in FIG. 8, the content of utterance 62 of each speaker is stored in correspondence with the speaker's name 61 in order of the utterance. As a result, the minutes for recording the content of utterance of each attendant are automatically edited.

As mentioned-above, the collected multimedia information is stored in the multimedia database 11 by the format shown in FIG. 9 or FIG. 10. For example, in FIG. 9, the stored information consists of an information discrimination number 71, an attribute 72, and an attribute value 73. In FIG. 10, the stored information consists of a name·face image file name tag 74, a company·card image file name tag 75, a meeting tag 76, and an utterance content recording file name·recognition result tag 77.

As shown in FIG. 9, in case of the meeting as the object, each item (index) of the attribute 72 is "name", "company name", "address", "telephone", or "Facsimile". As for each item, the recognition result from the card image in FIG. 5 is assigned as the attribute value 73. As for the item "face", a file name of face image recognized/analized from the person's image in FIG. 6 is assigned as the attribute value 73. As for the item "card", a file name of card image in FIG. 5 is assigned as the attribute value 73. As for the item "meeting", the meeting name to which the person attended in the past is assigned as the attribute value 73. As for the item "utterance", a file name of speech of the person's utterance in the meeting and a file name of text recognized/converted by the speech recognition unit 7 are assigned as the attribute value 73. As for the item "material", a file name of the material distributed in the meeting is assigned as the attribute value 73. As for the item "memo", a file name of memo for the person which the user enters in correspondence with the image at S4 in FIG. 3 is assigned as the attribute value 73. As mentioned-above, these attribute values are relationally stored in the multimedia database 11 by a control function of the information recognition/analysis unit 3. Furthermore, the multimedia information collection unit 1 may include an attribute value addition means. For example, the multimedia information shown in FIG. 9 is displayed on the information screen 31 of the front operation part 21 of the multimedia information collection unit 1. The user checks the attribute value in the displayed multimedia information, and he often finds the attribute item necessary for addition or correction. In this case, the user can add a new attribute value corresponding to the item or correct the attribute value corresponding to the item by the attribute value addition means. In response to the addition/correction information from the attribute value addition means, the information recognition/analysis unit 3 adds the new attribute value corresponding to the item or corrects the attribute value corresponding to the item in the multimedia database 11.

As mentioned-above, in the first embodiment, various kinds of related multimedia information based on the input image is correspondingly stored in the multimedia database 11. In short, the multimedia information is effectively stored in correspondence with predetermined purpose data. Especially, by preparing the object extraction unit 4 for extracting recognition/analysis object based on the mark of recognition area on the image, and the analysis control unit 5 for controlling the knowledge dictionary and the method used for recognition/analysis, the recognition/analysis method of high level is selectively used without complicated operation.

Variations of the first embodiment are within the scope of this invention. In the first embodiment, as a method for relating the multimedia information, an approach based on the image (still image) was explained as the example. However, the approach based on the dynamic image, the speech, or the text data may be applied. Furthermore, in the first embodiment, as the example for relating the multimedia information, the meeting (conference) was explained. However, the example is not limited to meetings. For example, travel, an exhibition, and daily family life may be applied to the present invention.

In the first embodiment, the multimedia information is collected, and the related multimedia information is correspondingly arranged and stored in the database. However, even if this kind of database is created, a method of practical use must be taken into consideration. In short, in order to practically use the multimedia information in the database, a means for retrieving purpose data is necessary. Therefore, in the second embodiment, a method for selectively retrieving collected multimedia information is explained.

Figure 11:
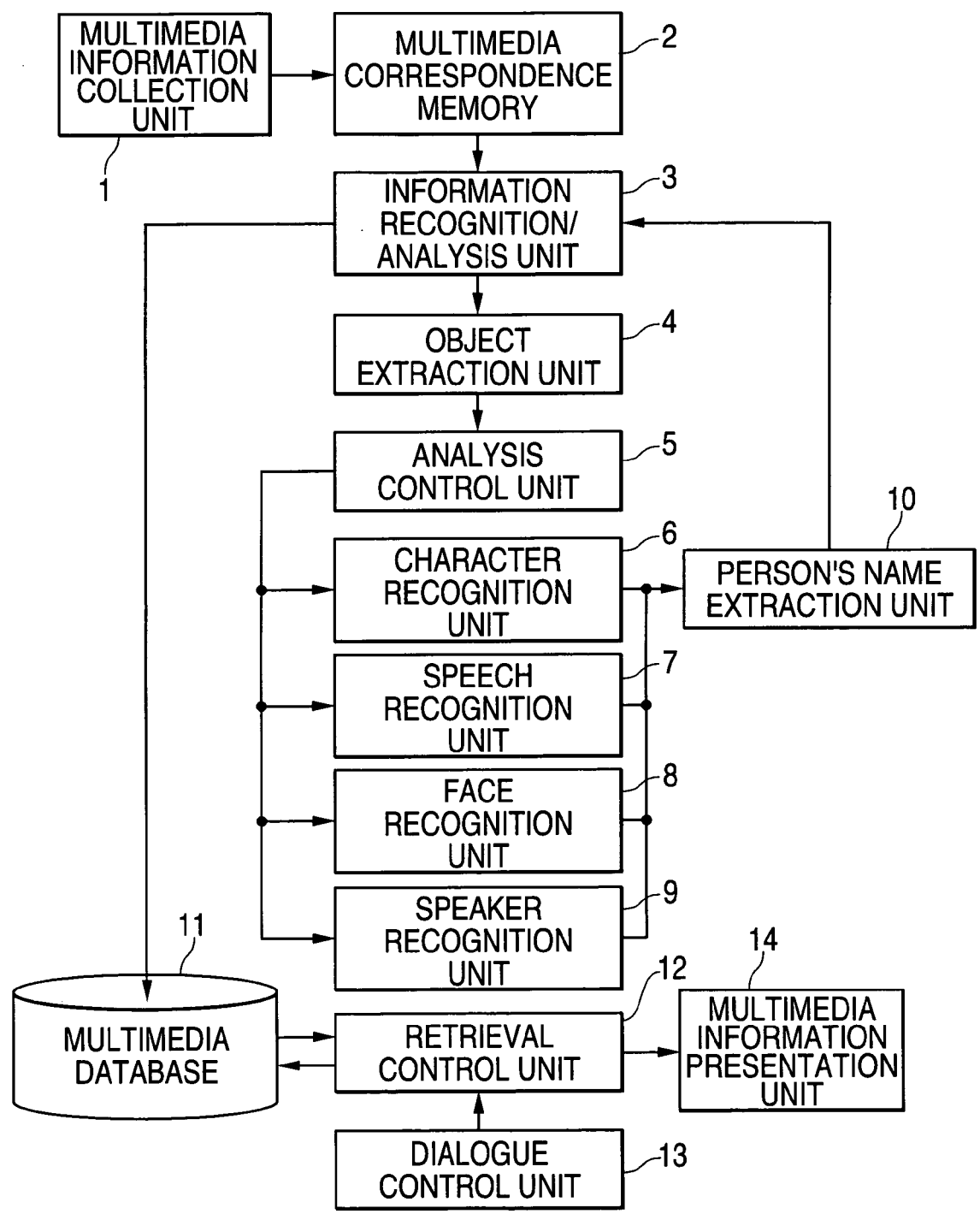
FIG. 11 is a block diagram of the multimedia information collection control apparatus according to a second embodiment of the present invention.

FIG. 11 is a block diagram of the multimedia information collection control apparatus according to the second embodiment of the present invention. Basic components of the second embodiment are the same as the first embodiment shown in FIG. 1. However, as shown in FIG. 11, the multimedia information collection control apparatus of the second embodiment additionally includes a retrieval control unit 12, a dialogue control unit 13, and a multimedia information presentation unit 14. The dialogue control unit 13 receives a retrieval request from the user, analyzes a semantics content of the retrieval request, and generates a retrieval condition based on the semantics content. The retrieval control unit 12 receives the retrieval condition from the dialogue control unit 13 and retrieves the multimedia information from the multimedia database 11 by the retrieval condition. The multimedia information presentation unit 14 presents the retrieved result to the user. In this case, the dialogue control unit 13 can receive the retrieval sentence of natural language, analyze the semantics content of the retrieval sentence of natural language, and indicate how to retrieve the user's desired data to the retrieval control unit 12. Furthermore, the multimedia information presentation unit 14 can convert the retrieval result of the database or the retrieval request of the user to a proper format and present it to the user.

Figure 12:
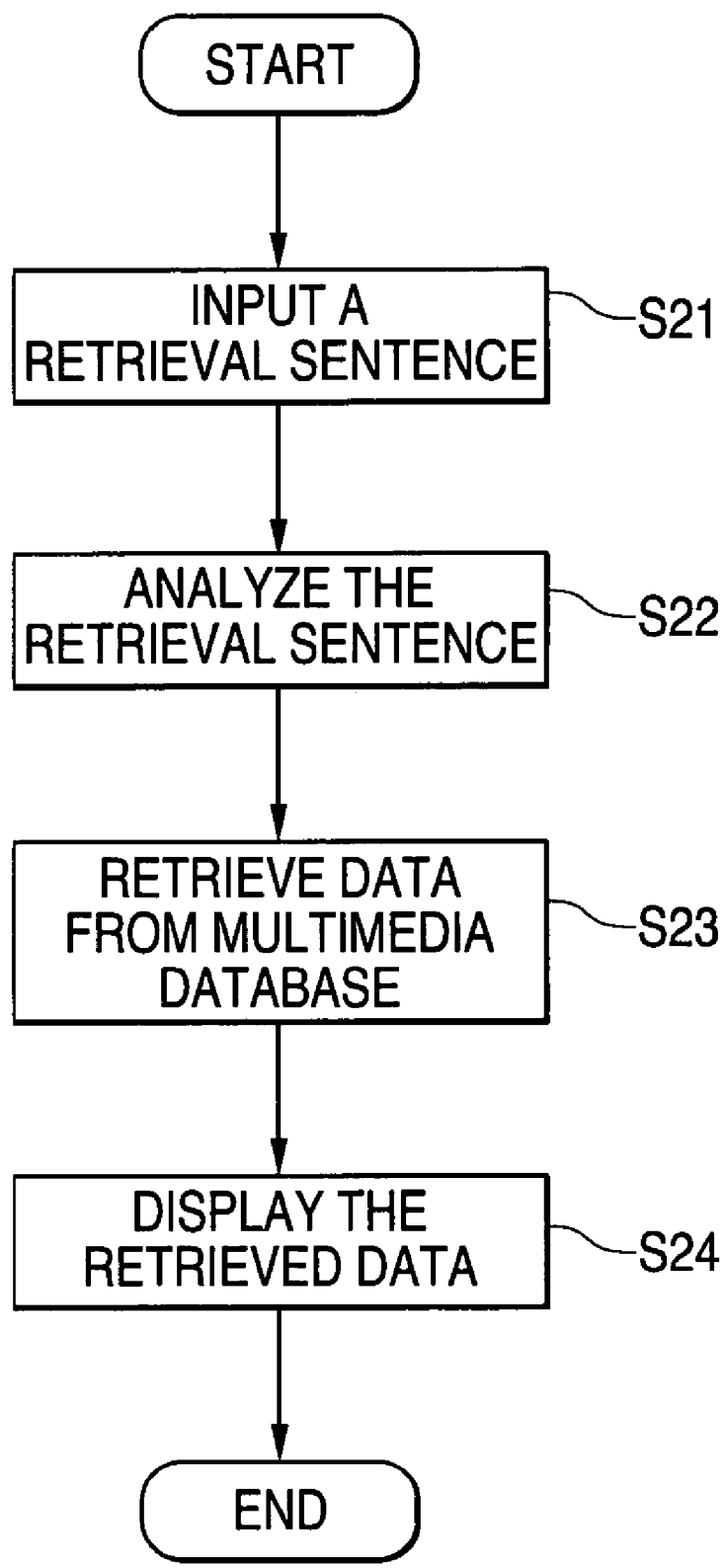
FIG. 12 is a flow chart of processing of the multimedia information collection control apparatus according to the second embodiment of the present invention.

FIG. 12 is a flow chart of processing of retrieving the multimedia information from the multimedia database 11 according to the second embodiment. As shown in FIG. 9, the multimedia database 11 relationally stores the multimedia information collected by the multimedia information collection unit 1 and correspondingly arranged by the information recognition/analysis unit 3. First, when the user inputs the retrieval sentence through some retrieval sentence input means (For example, natural language input by speech) (S21), the dialogue control unit 13 analyzes the retrieval sentence, and supplies the analysis result to the retrieval control unit 12 (S22). The retrieval control unit 12 retrieves the multimedia database 11 by the retrieval condition based on the analysis result and extracts the multimedia information of the purpose (S23). The multimedia information presentation unit 14 converts the extracted multimedia information to a proper format based on the retrieval sentence and presents it to the user (S24).

For example, assume that the retrieval sentence "Who attended the planning meeting which Mr. Suzuki attended ?" is input to the dialogue control unit 13. The dialogue control unit 13 analyzes the content of the retrieval sentence of natural language, generates a semantics content "Retrieve attendance of the planning meeting which Mr. Suzuki attended." from the analysis result of the retrieval sentence, and supplies this semantics content as a retrieval condition to the retrieval control unit 12. The retrieval control unit 12 receives the retrieval condition from the dialogue control unit 13, and begins to retrieve data matched with the retrieval condition from the multimedia database 11. First, the retrieval control unit 12 extracts "a database of Mr. Suzuki" from the multimedia database 11 as shown in FIG. 9. By referring to the contents of the database of Mr. Suzuki shown in FIG. 9, the retrieval control unit 12 decides that "the planning meeting" in the retrieval sentence is "planning meeting of new enterprise (Jul. 12, 1999)", retrieves all databases in the multimedia database 11 by "planning meeting of new enterprise (Jul. 12, 1999)" as a keyword, and extracts attendance data. The retrieval control unit 12 supplies the extracted data to the multimedia information presentation unit 14. As shown in FIG. 13, the multimedia information presentation unit 14 converts the extracted data to a proper presentation format for the retrieval request and displays the converted data.

Figure 14:
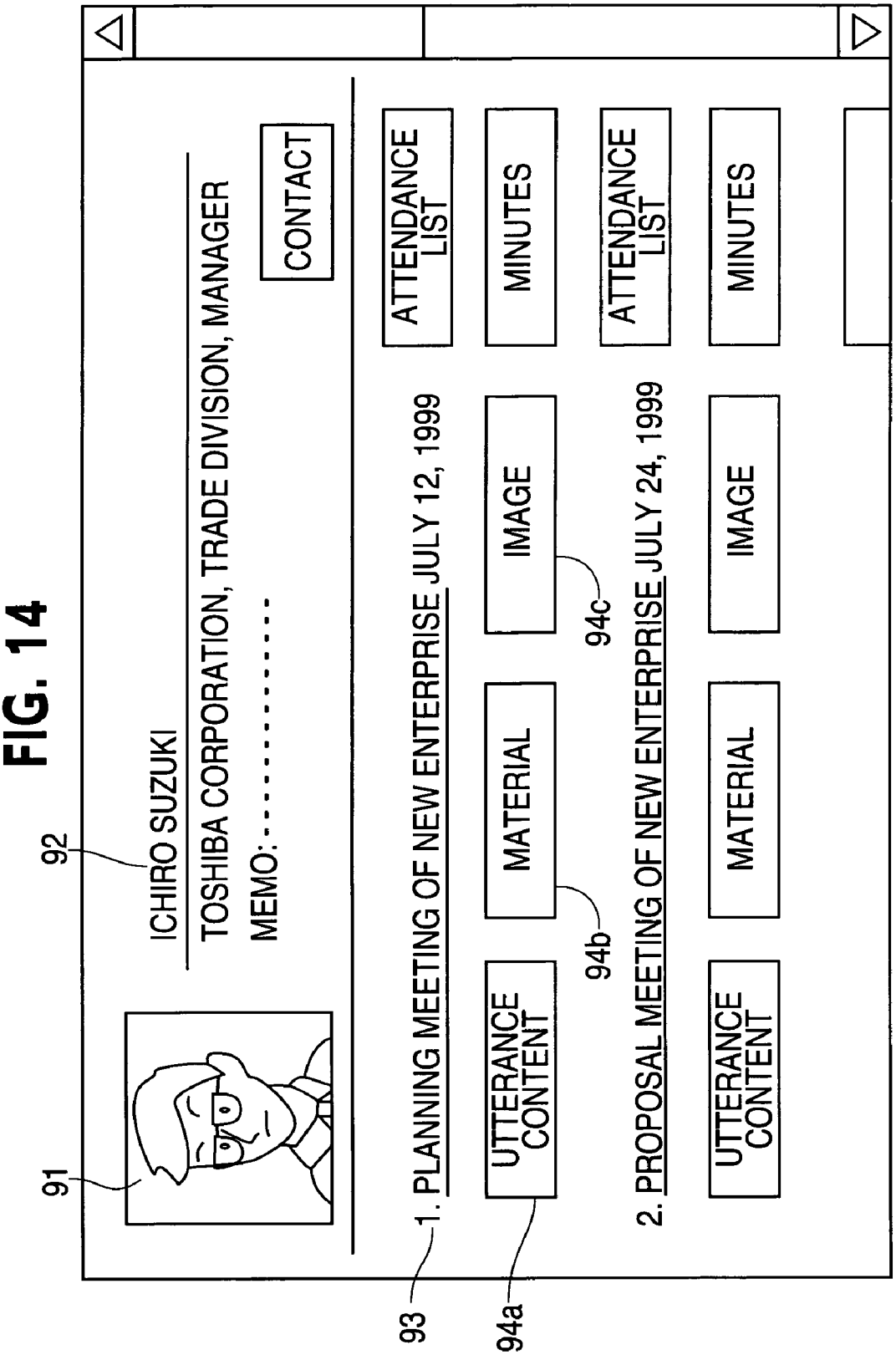
FIG. 14 is a schematic diagram of one example of detail content of the retrieval result displayed by the multimedia information presentation unit according to the second embodiment.

In FIG. 13, the retrieval sentence 81 is displayed at the upper side. As the retrieval result for the retrieval sentence 81, meeting data 82 and attendance data 83 with face photograph are displayed as a list. If the user selects the name or the face photograph of one attendant, detailed information about the attendant is displayed as shown in FIG. 14. In FIG. 14, the face photograph 91, the name and position 92, a list 93 of meetings attended in the past, and a button 94 linked to related information in the meeting are displayed. If the user selects each button 94, the user can refer to the collected information in the past. For example, if the user selects a button 94a "utterance content", the utterance content of the attendant in the meeting is output as it is, or text data converted from the utterance content is displayed. If the user selects a button 94c "image", an image of all attendants with character/figure memo is displayed. This image of the attendants was taken by the digital camera during the meeting.

Figure 15:
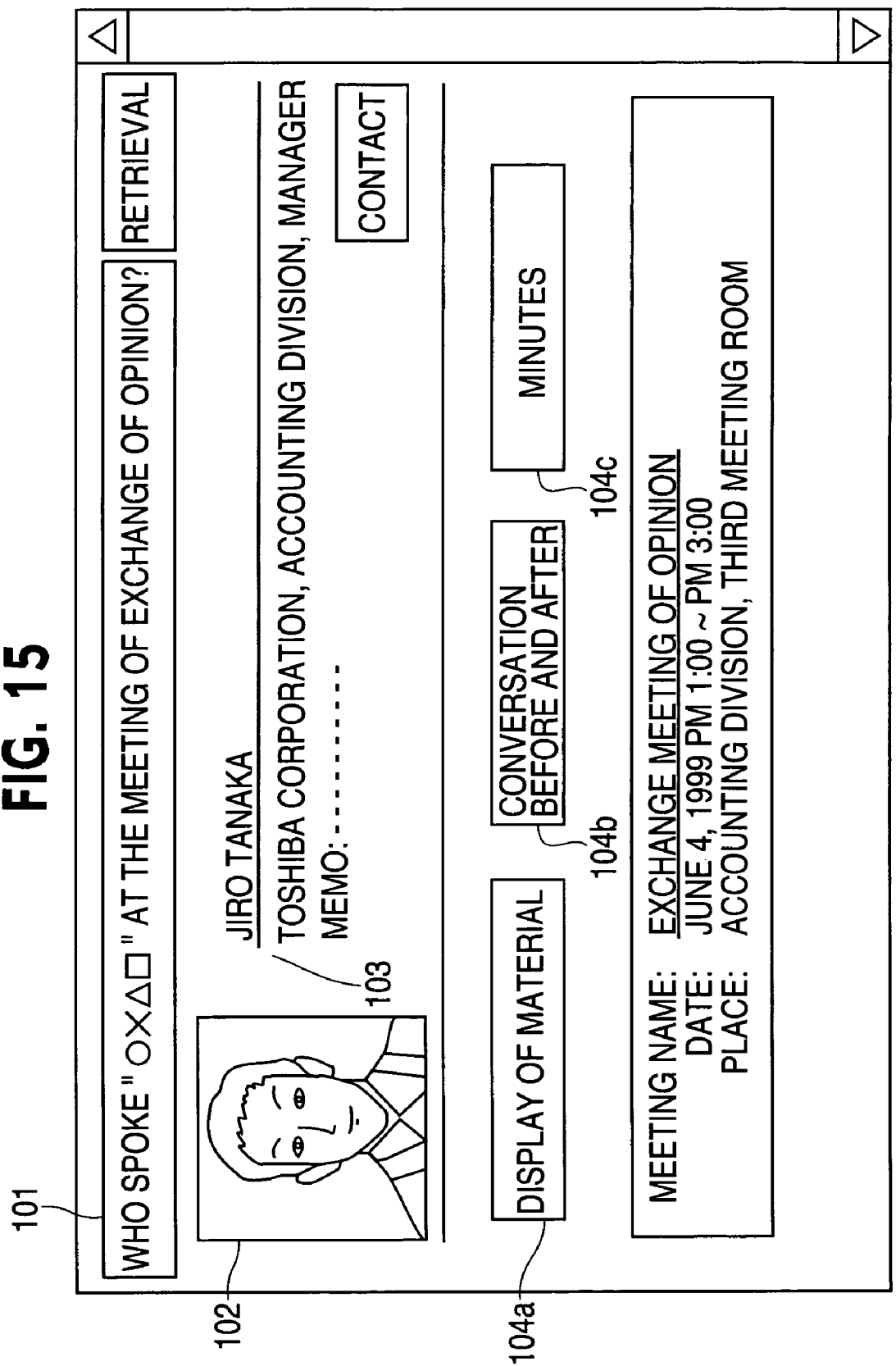
FIG. 15 is a schematic diagram of another example of the retrieval result displayed by the multimedia information presentation unit according to the second embodiment.

Furthermore, if another retrieval sentence "Who spoke "○X△□" at the meeting of exchange of opinion ?" is input, the dialogue control unit 13 generates a semantics content "Retrieve a person who spoke "○X△□" at the meeting of exchange of opinion." from the retrieval sentence and supplies the semantics content as a retrieval condition to the retrieval control unit 12. The retrieval control unit 12 receives the retrieval condition from the dialogue control unit 13 and begins to retrieve the data matched with the retrieval condition. First, the retrieval control unit 12 retrieves the multimedia database 11 by the retrieval keywards "meeting of exchange of opinion" and person who spoke "○X△□", extracts the item and content related to the retrieval keywords, and supplies the extracted data to the multimedia information presentation unit 14. In this case, the multimedia database 11 relationally stores personal data such as the name, position, and face photograph of the person who spoke "○X △□" at "meeting of exchange of opinion". Accordingly, the retrieval control unit 12 can extract the personal data matched with the person who spoke "○X△□" at "meeting of exchange of opinion". The retrieval control unit 12 supplies the extracted data to the multimedia information presentation unit 14. For example, as shown in FIG. 15, the multimedia information presentation unit 14 displays personal data with a face photograph 102 of the speaker. Furthermore, the retrieval control unit 12 supplies a material for a subject of the meeting and link data to conversation before and after the utterance of the speaker to the multimedia information presentation unit 14. As shown in FIG. 15, the multimedia information presentation unit 14 displays the speaker's data 103 (name, company name, position, and memo data), the face photograph 102, an operation button 104a linked to the material for the subject of the meeting, an operation button 104b linked to the conversation before and after the utterance, and an operation button 104c linked to the minutes of the meeting. Accordingly, the user selectively operates these buttons 104a ~104c if necessary. By operating a button, the retrieval control unit 12 retrieves the data linked by the operation button from the multimedia database 11 and controlls the multimedia information to display the retrieved data. By using this function, the user can refer to the material and playback the conversation of the meeting if necessary.

As mentioned-above, in the second embodiment, the multimedia database stores the linked multimedia information based on the relation. In addition to this, the retrieval control unit for retrieving the database and the multimedia information presentation unit for displaying the retrieval result are prepared. Accordingly, the multimedia database 11 is retrievable by one or plural retrieval conditions. Especially, the dialogue control unit 13 analyzes the retrieval sentence of natural language. The retrieval control unit 12 retrieves the multimedia database 11 according to the analysis result. The multimedia information presentation unit 14 presents the retrieval result to the user by a proper format. In short, various kinds of multimedia information can be retrieved from the multimedia database by an inquiry as natural dialogue. Accordingly, the multimedia information collection apparatus of the second embodiment is very useful for the user in comparison with the prior art.

Variations of the second embodiment are within the scope of the invention. In the second embodiment, a natural language sentence of text was explained as an example of retrieval request. However, the retrieval request is not limited to the natural language sentence. For example, the retrieval request may be the face image, or speech. In case of the face image, the face recognition unit is additionally prepared to the retrieval control unit 12 in FIG. 11. In case of the speech, the speech recognition unit 7 is additionally prepared to the retrieval control unit 12 in FIG. 11.

In the first and second embodiments, in order to draw a figure of the recognition area on the image, a figure input means such as a pen input was explained as the example. However, a method for indicating the recognition area other than the pen input may be used. For example, a method for drawing by finger movement while some motion detection means is attached to the finger, a method for controlling the drawing by speech, a method for inputting the image by overlapping the recognition area with previously drawn figure through the screen, may be selectively used.

A memory can be used to store instructions for performing the process described above. The process may be performed with the aid of a general purpose computer or microprocessor. Such a memory can thus be a CD-ROM, floppy disk, hard disk, magnetic tape, semiconductor memory, and so on.

Other embodiments of the invention will be apparent to those skilled in the art from consideration of the specification and practice of the invention disclosed herein. It is intended that the specification and examples be considered as exemplary only, with the true scope and spirit of the invention being indicated by the following claims.

What is claimed is:

1. A multimedia information collection control apparatus, comprising:
   a multimedia information collection unit configured to collect multimedia information from a plurality of kinds of input devices, including a camera and a microphone;
   a multimedia correspondence memory configured to correspondingly store the multimedia information including an image and a speech;
   a display configured to output the image and an attribute selection window including a plurality of attribute items of characters;
   an indicator configured to artificially specify a recognition area of the image on said display by using a mark, a shape of the mark corresponding to a kind of a recognition object;
   an information recognition unit having a plurality of knowledge dictionaries each corresponding to each of the plurality of attribute items, configured to select one attribute item from the plurality of attribute items in response to a user's indication, to recognize characters in the recognition area by using one of the plurality of knowledge dictionaries corresponding to the one attribute item and the kind of the recognition object, to extract personal data from the recognition result of the characters, and to identify a speaker from the speech; and
   a multimedia database configured to relationally store the multimedia information in correspondence with the identified speaker by using the personal data.

2. The multimedia information collection control apparatus according to claim 1,
   wherein the plurality of attribute items include a date, a meeting name, a place, a card, a name, a company name, a telephone number, a section name, an address, and an utterance content.

3. The multimedia information collection control apparatus according to claim 2, wherein said indicator artificially selects one attribute item corresponding to the characters in the image from the plurality of attribute items of the attribute selection window on said display.

4. The multimedia information collection control apparatus according to claim 3, wherein, if the one attribute item is a card, said information recognition unit recognizes the characters in the image by using one knowledge dictionary corresponding to the card.

5. The multimedia information collection control apparatus according to claim 4, wherein if the one attribute item is a card, said multimedia database stores the recognition result of the characters of the card as the speaker's personal data.

6. The multimedia information collection control apparatus according to claim 5:
   wherein said information recognition unit includes a speech recognition unit configured to recognize the speech in the multimedia information; and
   wherein said multimedia database stores the recognition result of the speech in correspondence with the speaker's personal data.

7. The multimedia information collection control apparatus according to claim 5:
   wherein said information recognition unit includes a face recognition unit configured to recognize a facial characteristic of a face area in the image; and
   wherein said multimedia database stores the recognition result of the facial characteristic in correspondence with the speaker's personal data.

8. The multimedia information collection control apparatus according to claim 1, wherein said information recognition unit extracts an area specified by the mark from the image, recognizes an object in the area by using the recognition method for the kind of the recognition object corresponding to the shape of the mark.

9. The multimedia information collection control apparatus according to claim 8:
   wherein said display presents a plurality of recognition area indication buttons each corresponding to different kind of the recognition object; and
   wherein said indicator artificially points to the recognition area of the image on said display, and artificially selects a recognition area indication button corresponding to the kind of the recognition object in the recognition area.

10. The multimedia information collection control apparatus according to claim 9:
   wherein said display presents the mark of the shape corresponding to the kind of the recognition object of the selected recognition area indication button on the recognition area; and
   wherein said indicator artificially adjusts a size and a position of the shape of the mark to the recognition area on said display.

11. The multimedia information collection control apparatus according to claim 10, wherein said information recognition unit selectively uses a plurality of recognition methods each corresponding to a different kind of the recognition object according to the selected recognition area indication button.

12. The multimedia information collection control apparatus according to claim 1, wherein said multimedia database correspondingly stores a record identification of each item of the multimedia information.

13. The multimedia information collection control apparatus according to claim 12:
   wherein said multimedia information collection unit includes an information addition unit configured to additionally input information to said multimedia database; and
   wherein said multimedia database additionally stores the input information for corresponding multimedia information.

14. The multimedia information collection control apparatus according to claim 12, further comprising a dialogue control unit configured to input a retrieval request from a user, to analyze the retrieval request, and to generate a retrieval key according to the analysis result.

15. The multimedia information collection control apparatus according to claim 14;
   further comprising a retrieval control unit configured to retrieve the multimedia database by comparing the retrieval key with the record identification of each item of the multimedia information; and
   wherein said multimedia information collection unit presents the retrieved information through said display.

16. A method for controlling collection of multimedia information, comprising:
   collecting multimedia information from a plurality of kinds of input devices, including a camera and a microphone;
   correspondingly storing the multimedia information including an image and a speech;
   displaying the image and an attribute selection window including a plurality of attribute items of characters;
   artificially specifying a recognition area of the image by using a mark, a shape of the mark corresponding to a kind of a recognition object;
   preparing a plurality of knowledge dictionaries each corresponding to each of the plurality of attribute items;
   selecting one attribute item from the plurality of attribute items in response to a user's indication; recognizing characters in the recognition area by using one of the plurality of knowledge dictionaries corresponding to the one attribute item and the kind of the recognition object;
   extracting personal data from the recognition result of the characters;
   identifying a speaker from the speech; and
   relationally storing the multimedia information in correspondence with the identified speaker by using the personal data.

17. A computer program product, comprising:
   a computer readable program code embodied in said product for causing a computer to control collection of multimedia information, said computer readable program code comprising:
      a first program code to collect multimedia information from a plurality of kinds of input devices, including a camera and a microphone;
      a second program code to correspondingly store the multimedia information including an image and a speech;
      a third program code to display the image and an attribute selection window including a plurality of attribute items of characters;
      a fourth program code to artificially specify a recognition area of the image by using a mark, a shape of the mark corresponding to a kind of a recognition object;
      a fifth program code to prepare a plurality of knowledge dictionaries each corresponding to each of the plurality of attribute items;
      a sixth program code to select one attribute item from the plurality of attribute items in response to a user's indication;
      a seventh program code to recognize characters in the recognition area by using one of the plurality of knowledge dictionaries corresponding to the one attribute item and the kind of the recognition object;
      an eighth program code to extract personal data from the recognition result of the characters;
      a ninth program code to identify a speaker from the speech; and
      a tenth program code to relationally store the multimedia information in correspondence with the identified speaker by using the personal data.

* * * * *